(12) United States Patent
Fantone et al.

(10) Patent No.: US 9,282,325 B2
(45) Date of Patent: Mar. 8, 2016

(54) COMPACT SYSTEM FOR PRESENTING WIDE FIELD OBJECT TARGET TO TEST OPTIC OR SYSTEM

(71) Applicant: OPTIKOS CORPORATION, Wakefield, MA (US)

(72) Inventors: Stephen D Fantone, Lynnfield, MA (US); Daniel Orband, Boxford, MA (US); David Paul Biss, Brighton, MA (US)

(73) Assignee: Optikos Corporation, Wakefield, MA (US)

( * ) Notice: Subject to any disclaimer, the term of this patent is extended or adjusted under 35 U.S.C. 154(b) by 0 days.

(21) Appl. No.: 14/339,677

(22) Filed: Jul. 24, 2014

(65) Prior Publication Data

US 2015/0077571 A1    Mar. 19, 2015

Related U.S. Application Data

(60) Provisional application No. 61/859,332, filed on Jul. 29, 2013.

(51) Int. Cl.
*H04N 13/00* (2006.01)
*H04N 17/00* (2006.01)

(52) U.S. Cl.
CPC .................. *H04N 17/002* (2013.01)

(58) Field of Classification Search
CPC ............ H04N 17/002; H04N 13/0014; G06T 7/0018; G06T 7/0022; G02B 2027/0138; G02B 2027/015; G02B 27/0172; G02B 27/0101
See application file for complete search history.

(56) References Cited

U.S. PATENT DOCUMENTS

| | | | | | |
|---|---|---|---|---|---|
| 3,982,824 | A | * | 9/1976 | Rambauske | 359/859 |
| 5,640,283 | A | * | 6/1997 | Warren | 359/859 |
| 8,633,894 | B1 | * | 1/2014 | Mealy | 345/166 |
| 2005/0259158 | A1 | * | 11/2005 | Jacob et al. | 348/218.1 |
| 2007/0188603 | A1 | * | 8/2007 | Riederer et al. | 348/54 |
| 2008/0297889 | A1 | * | 12/2008 | Shafer et al. | 359/365 |
| 2013/0038689 | A1 | * | 2/2013 | McDowall | 348/45 |
| 2013/0222384 | A1 | * | 8/2013 | Futterer | 345/426 |

* cited by examiner

*Primary Examiner* — Victor Kostak
(74) *Attorney, Agent, or Firm* — Francis J. Caufield

(57) ABSTRACT

Apparatus for evaluating optical components and systems that uses a precision compact mirror support structure to present to an optical system or electro-optical system (e.g., a camera) multiple images of at least one optical evaluation target over a wide field to allow assessment of the performance or alignment of the optical or electro-optical system over its intended field of use. The mirror support structure generates multiple images of an optical evaluation target by providing multiple folded optical paths between the target and the desired field locations of the test optic. The mirrors employed may either be parallel or at angles with respect to one another.

17 Claims, 13 Drawing Sheets

Number Of Bounces On One Side Of Field Of View = L/W tan ($\Theta n$)
(round down to integer)

$$\tan\left(\frac{\theta_{StFOV}}{2}\right) = W/2, \text{ where } h = 1/2$$

*of kaleidoscope aperture, W*

Path 1, Θ = 0
Path 2, Θ = arctan(W/L)
Path 3, Θ = arctan(2W/L).

Path N, Θ = A tan⁻¹((N-1)W/L) →
[tanΘ]L/W = N-1

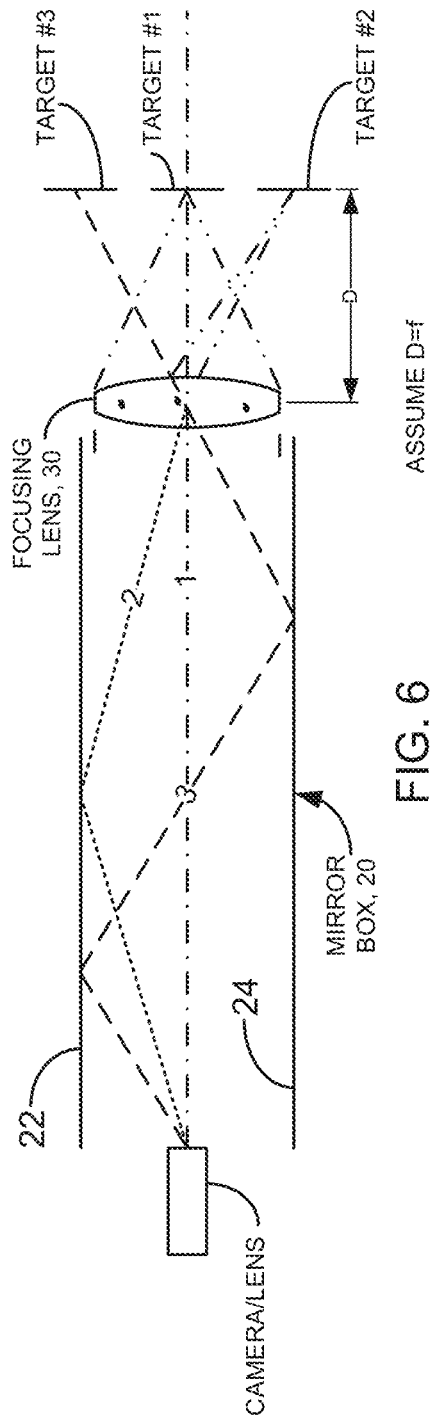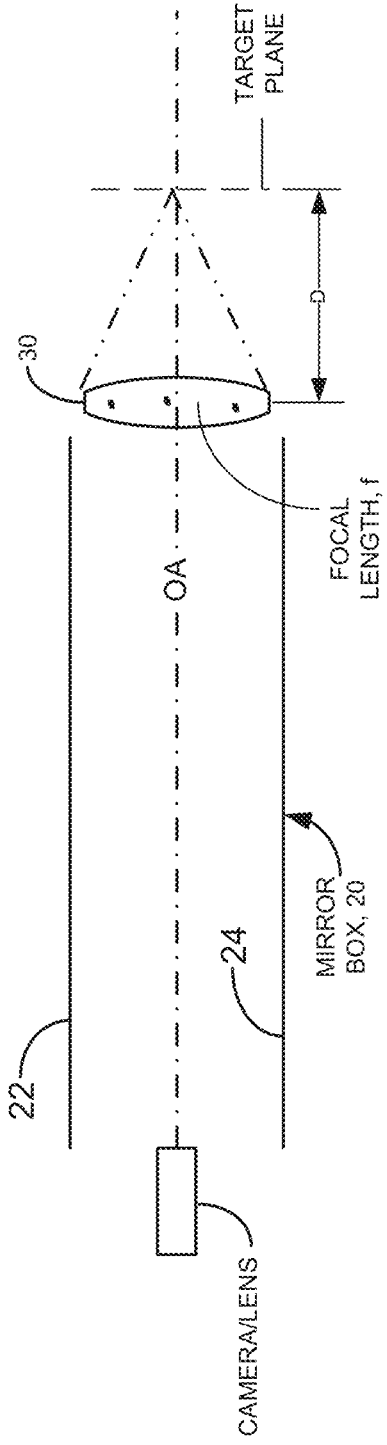
FIG. 6
FIG. 7
D is set to provide a range of conjugates. When D= focal length, target appears at infinity. Use $1/f = -1/D + 1/s'$ to calculate virtual distance.

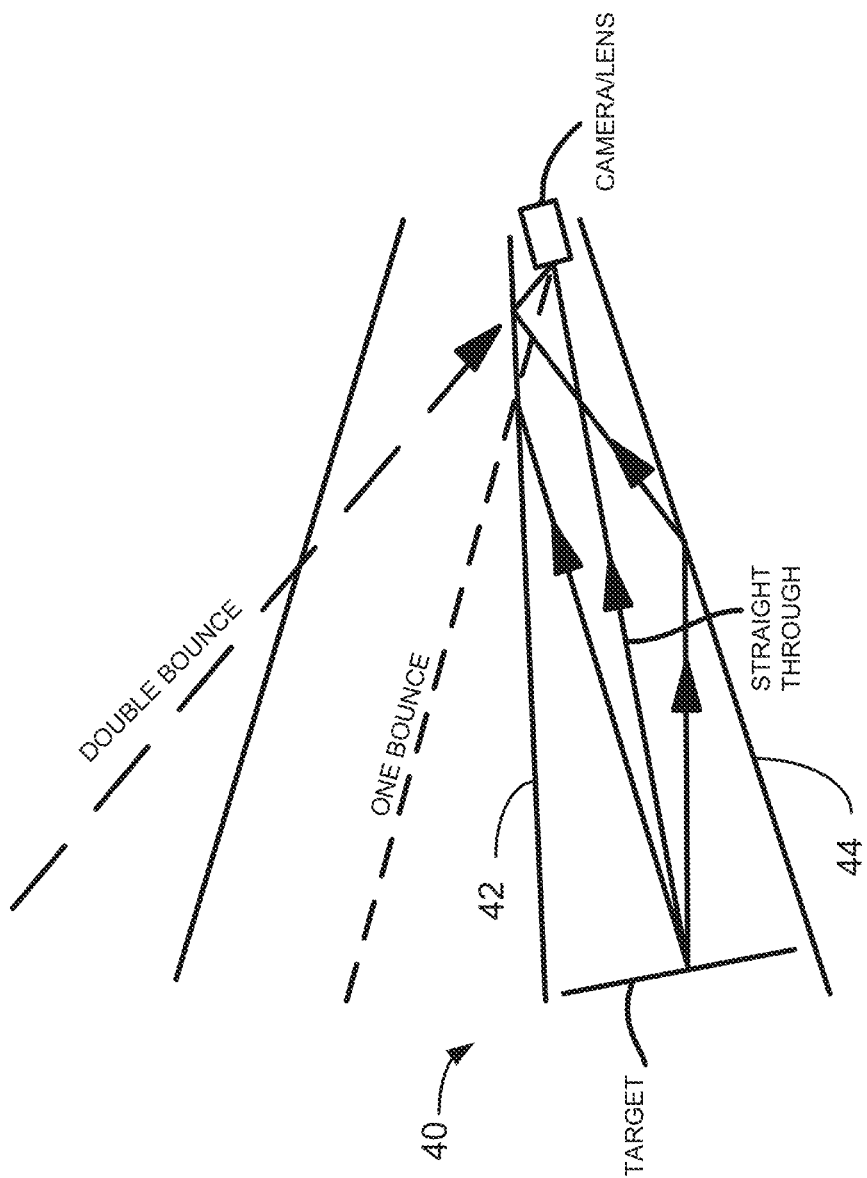

IMAGINE A NUMBER OF PLANES FOR DIFFERENT OBJECT DISTANCES

COMPACT SYSTEM FOR PRESENTING WIDE FIELD OBJECT TARGET TO TEST OPTIC OR SYSTEM

CROSS REFERENCE TO RELATED APPLICATION

This application claims the benefit of the filing date of U.S. Provisional Patent Application No. 61/859,332 filed on Jul. 29, 2013 in the name of Stephen D. Fantone, et al. with the title COMPACT SYSTEM FOR PRESENTING WIDE FIELD OBJECT TARGET TO TEST OPTIC OR SYSTEM, the entire contents of which are incorporated herein by reference.

BACKGROUND OF THE INVENTION

1. Field of the Invention

This invention generally relates to optical equipment for assessing the performance and alignment of optical components and systems and, more particularly, to apparatus for presenting object targets over a wide field of a test optic to assess its optical performance where the field of the test optic is commensurate with that at which it is intended for use.

2. Background of the Prior Art

To assess the performance (e.g., focus, MTF, sharpness, field tilt, alignment) of an optical system, such as a cell phone camera or automotive camera, one can place a target in front of the system and directly examine the image formed by the lens or, in the case of a camera, assess the quality of the image produced by the camera.

Such targets are typically spaced from the lens or camera at distances corresponding to the use of the product. In the case of a cell phone camera, the object may be placed in the range of a few inches to several meters away. It is straight forward to place a target near the camera. Placing a target at or beyond the hyperfocal distance of the camera or lens may require placement of the target several meters away. If the field of view of the camera or lens is substantial, the target can grow quite large in size. For instance, for a camera or lens with a field of view of +/−40 degrees, the target needs to be 2 times the tangent of 40 degrees (1.67) times the object distance. For this example, the Target Size=2*Distance*tan(half-angle), for a 40 degree half angle and a 1 meter distant object, then the target size is: Target Size=2*(1 m)*tan(40 degrees)=1.67 meters.

So, for an object distance of 1 meter, the target would be 1.67 meters across. This large size constrains the footprint of the test equipment, and it is desirable to minimize the floor space requirements for such test equipment. Furthermore, testing wide field lenses and extreme field of view lenses, like fisheye lenses, requires even larger targets that are simply impractical to use in a manufacturing environment.

Consequently, it is a principle object of this invention to provide a compact system that can present multiple object targets over a wide field to an optical system or electro-optical system (e.g., a camera) to allow assessment of the performance or alignment of the optical or electro-optical system over its intended field and conjugate(s) of use.

Other objects of the invention will be obvious or will appear hereinafter when the following detailed description is read with the accompanying drawings.

SUMMARY OF THE INVENTION

Apparatus for evaluating optical components and systems. More particularly, the invention is a precision compact apparatus structured to present to an optical system or electro-optical system (e.g., a camera) multiple images of at least one optical evaluation target over a wide field to allow assessment of the performance or alignment of the optical or electro-optical system over its intended field of use. This is achieved through the use of a mirror box or support structure arranged to generate multiple images of an optical evaluation target by providing multiple folded optical paths between the target and the desired field locations of the test optic. The optical evaluation target, when placed in front of the support structure, undergoes one or more reflections along the folded optical paths as the images travel to their assigned off-axis field locations where they can readily be observed by the test optic. The test optic and then image them onto a detector after which they can be analyzed to determine the performance of the test optic. The mirrors may reside in parallel opposed planes or be arranged in planes at an angle with respect to the optical axis to provide a tapered mirror box which can be shorter than one with parallel mirrors and yet still cover the same angular field.

In an aspect of the invention, support structure is fabricated of a single piece of stress relieved material having the necessary precision to meet performance requirements. The mirrors are positioned and held in place in mounts in the support structure. The mirrors are mounted without adjustment features so that the box can easily be moved from one measurement architecture to another without fear of the mirrors going out of alignment or adjustment or boxes can be interchangeably replaced without realignment or readjustment.

BRIEF DESCRIPTION OF THE DRAWINGS

The structure, operation, and methodology of the invention, together with other objects and advantages thereof. may best be understood by reading the detailed description in connection with the drawings in which each part has an assigned numeral label that identifies it wherever it appears in the various drawings and wherein:

FIG. 6 diagrammatically shows a lens at the end of a mirror box nearest the target to create a virtual image of the target at the appropriate distance relative to the end of the mirror box;

FIG. 7 diagrammatically depicts a relationship between the position of the lens, the target and the image of the target as practiced in one aspect of the invention;

FIG. 9A is a diagrammatic representation of a paper model of an unfolded optical path of a tapered mirror assembly;

DETAILED DESCRIPTION OF THE INVENTION

This invention generally pertains to apparatus for evaluating optical components and systems. More particularly, the invention is a precision compact apparatus structured to present to an optical system or electro-optical system (e.g., a camera) multiple images of at least one optical evaluation target over a wide field to allow assessment of the performance or alignment of the optical or electro-optical system over its intended field of use. This is achieved through the use of a support structure or mirror box (e.g. FIGS. 10 and 11) structured to generate multiple images of an optical evaluation target by providing multiple folded optical paths between the target and the desired field locations of the test optic. As will be seen, the optical evaluation target, when placed in front of the mirror box, undergoes one or more reflections along the folded optical paths as the images travel to their assigned off-axis field locations where they can readily be observed by the test optic. The test optic can then image them onto a detector after which they can be analyzed to determine the performance of the test optic.

Figure 1:
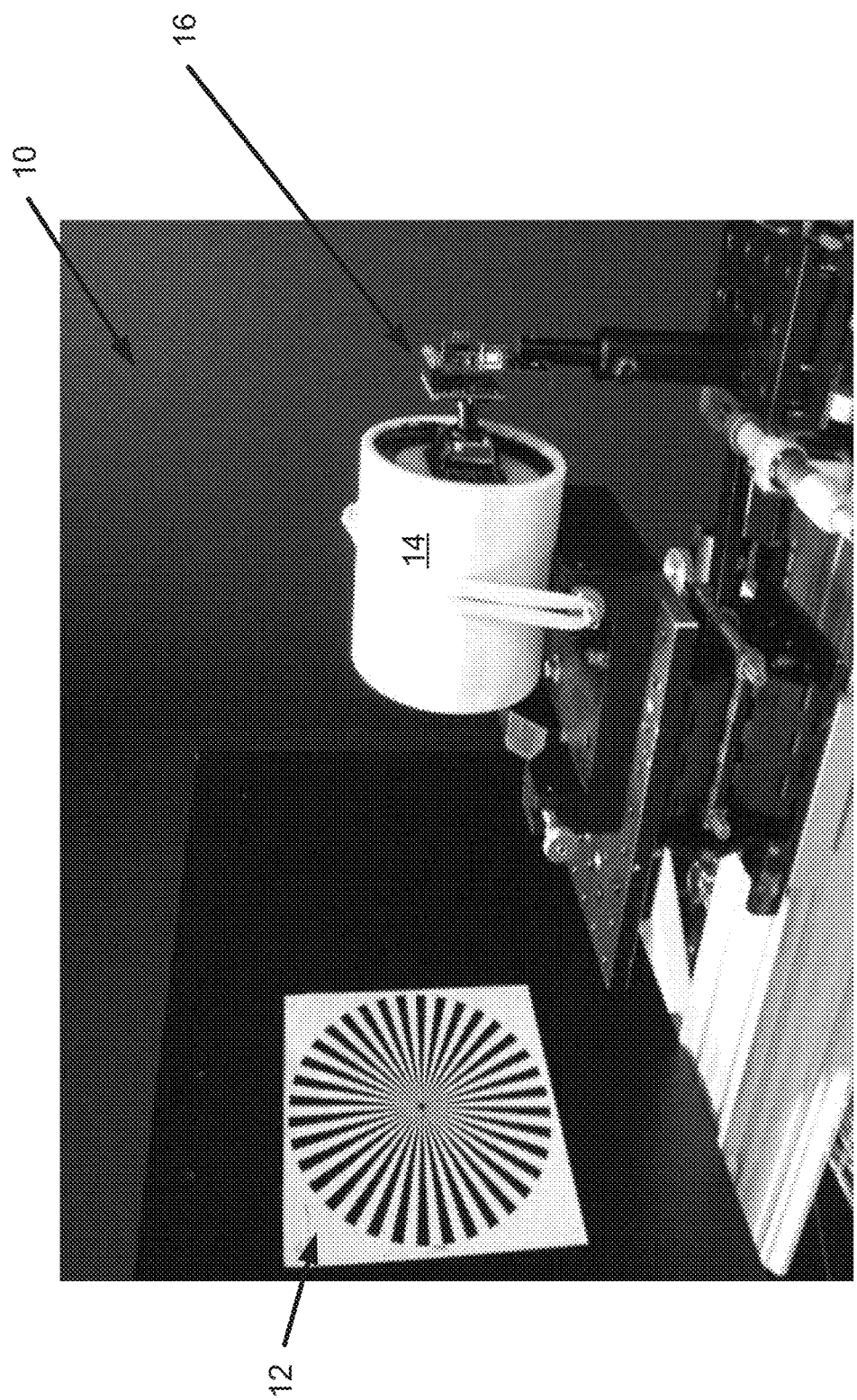
FIG. 1 show a photograph of a finite target used with a tapered mirror box (white) for use in presenting multiple images of the target to a widefield fisheye camera.

Reference is now made to FIG. 1 where a proof of principle system 10 is shown to comprise an optical evaluation target 12, a mirror box subsystem 14 and a test station 16 where a test optic forms images of the output of the mirror box onto a digital camera whose output is analyzed in a well-known manner by a computer programmed with suitable software to determine such performance parameters as MTF, focus with field location, and perform through focus studies. The test station includes well-known mounting fixtures for holding a test optic with respect to the exit pupil of system 10.

The optical evaluation target 12 shown consists of a series of alternating black and white pie segments whose spatial frequency varies as a function of radius, sometimes termed a star target. However, other optical evaluation targets are possible, and these may be selected from those consisting of fish tails, line segments, cross patterns, checkerboards, dots or pinholes, standard USAF resolution patterns, or others from which metrics of imaging performance such as line spread functions and the like can be derived.

As mentioned, this Invention utilizes a mirror box in the form of a kaleidoscopic light box whose mirrors fold the optical path into a compact volume. But for the use of the inventive light box, an equivalent test arrangement for determining the same performance evaluation as the invention would have to occupy a space of room-like proportions having one whole wall occupied by real optical evaluation targets to cover the full field of the test optic.

To understand how the invention achieves its compactness while still providing evaluation capability over a test optic full field, reference will now be made to FIG. 2 which shows a kaleidoscopic light box 20 having oppositely facing parallel mirrors 22 and 24 the ends of which define apertures at opposite ends of the box. In the right end aperture is a target and in the left aperture is a lens/camera or test optic shown in diagrammatic fashion. For narrow or moderate field systems, kaleidoscopic light box 20 utilizing parallel walls 22 and 24 can provide folded optical paths as shown in FIG. 2.

Figure 2:
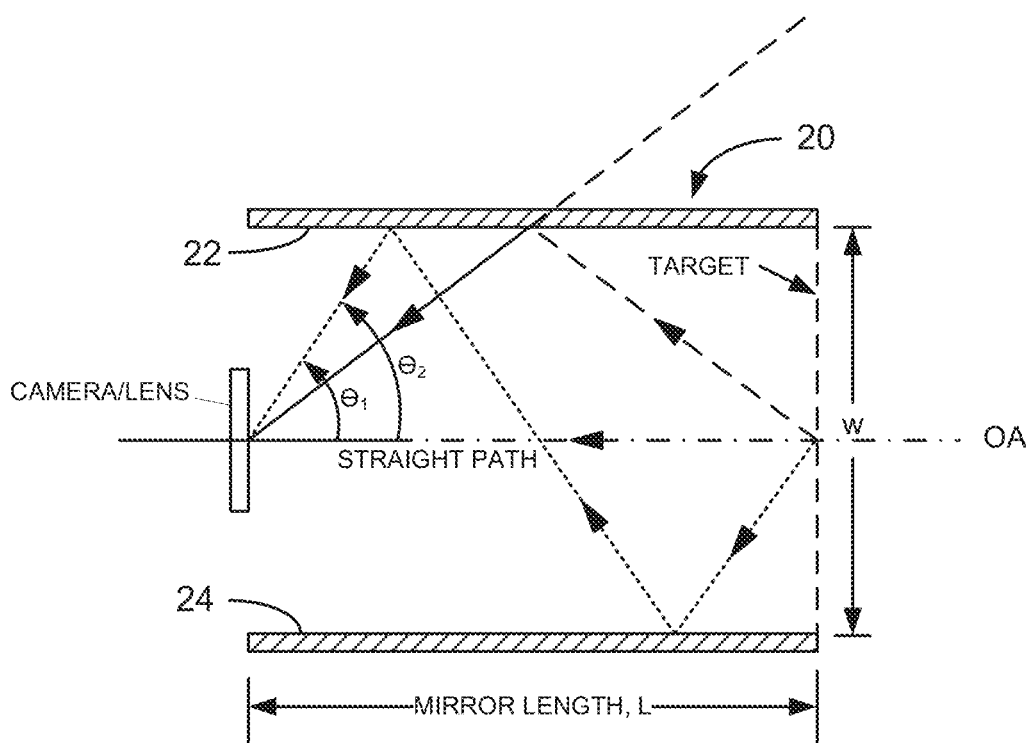
FIG. 2 diagrammatically shows a lens/camera placed to at one end of the plane opposed parallel mirror kaleidoscopic box with a target placed at the other end of the box.

As appreciated by FIG. 2, the kaleidoscopic light box 20 must be large enough to allow the lens/camera under test to be placed at one end of the box 20 with its field of test within the aperture of the box 20 but small enough to fit within the mechanical constraints of the overall test system such as that shown at 10. Note that the target does not need to be at the end of the kaleidoscopic mirror box 20, but can be located away from the kaleidoscopic mirror box 20 so long as the desired rays from the target are captured by the kaleidoscopic light mirror box 20.

As an example of scale, consider a system constraint in which it is desired to have a kaleidoscopic mirror box 20 and target footprint of 10 inches square with a target on axis and an off axis target located at a field of view of +/−40 degrees at an object distance of 10 inches. Then the center of the target, absent the box, would need to be at least 16.7 inches (2*tan (40 degrees)*10 inches=16.78 inches). By incorporating a mirror box that is constructed so that the parallel mirrors are separated by 8.38 inches between the mirrors (5*tan(40)*2), then the 40 degree field of view of the camera would bounce once off the kaleidoscope box wall and then be reflected to the center of the target. Thus, the optical path has been effectively folded to provide a more compact system.

Figure 3:
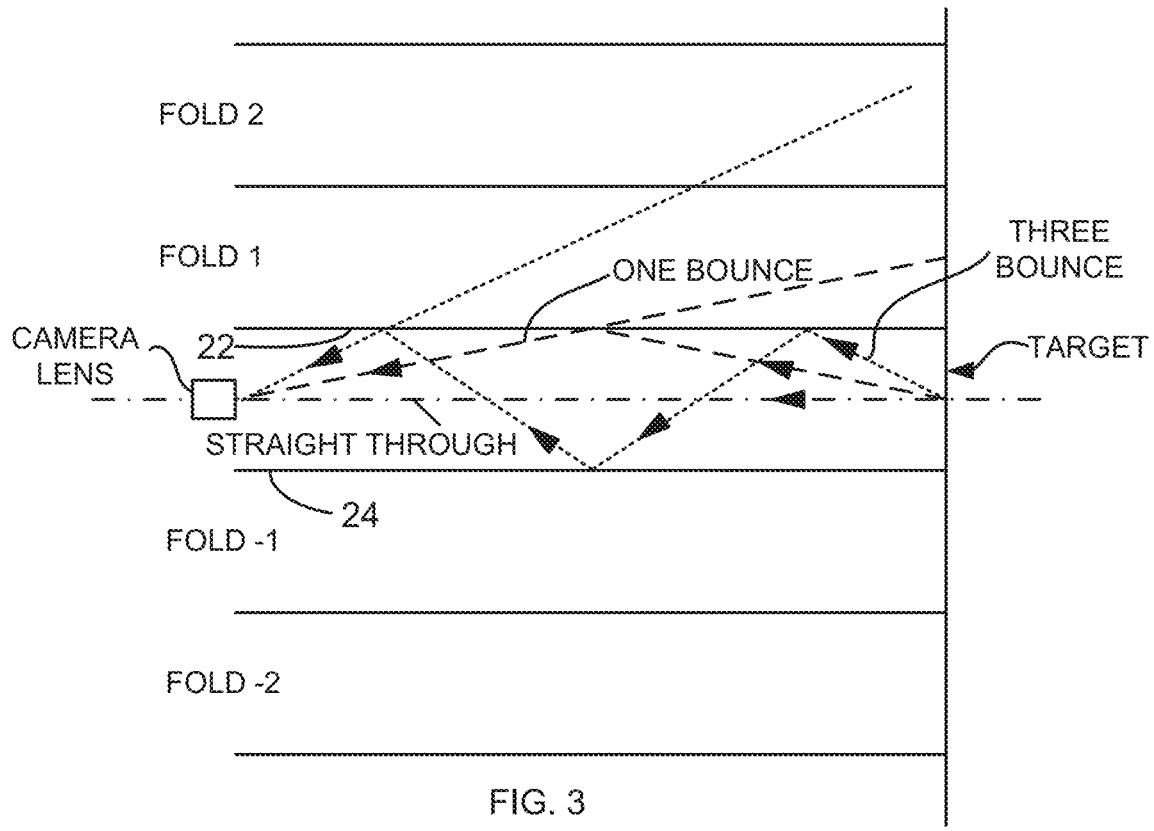
FIG. 3 diagrammatically shows three optical paths for a box such as that of FIG. 2.

Referring now to FIG. 3, three optical paths for such a box are depicted:
1. A straight through path;
2. A one bounce path in which the camera/lens views the target with one mirror reflection; and
3. A three bounce path in which the camera/lens views the target with reflections off two mirrors.

Clearly, this can be continued to steeper and steeper angles with the number of bounces increasing at higher field angles. The separation of the parallel mirrors 22 and 24 and the width, W, of the kaleidoscopic mirror box 20 thus can be configured to determine how many target fields will be visible across the desired field of view of the camera/lens.

Figure 4:
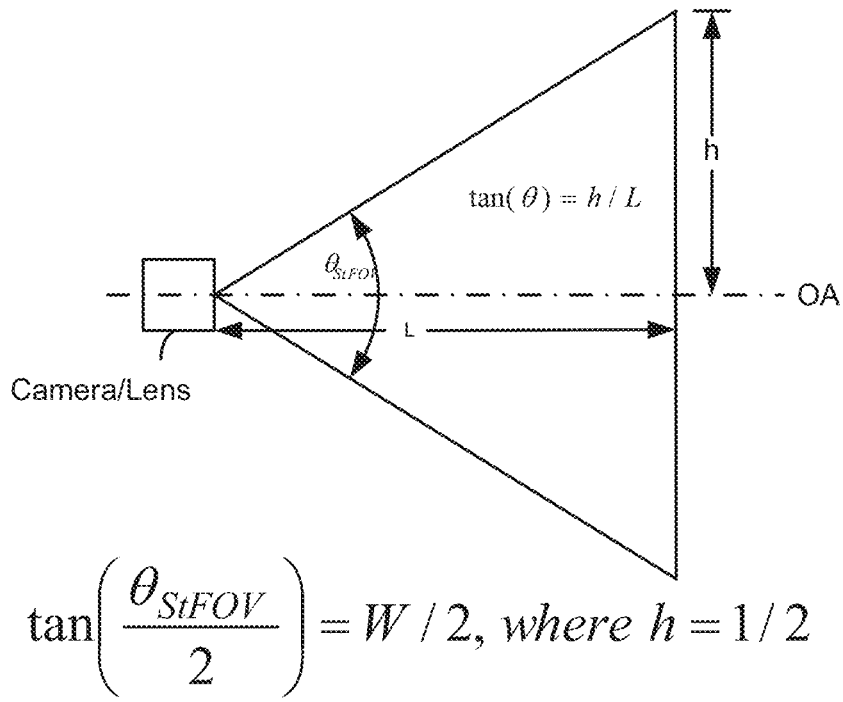
FIG. 4 diagrammatically shows the straight through field of view for a parallel mirror version of the invention.
Figure 5:
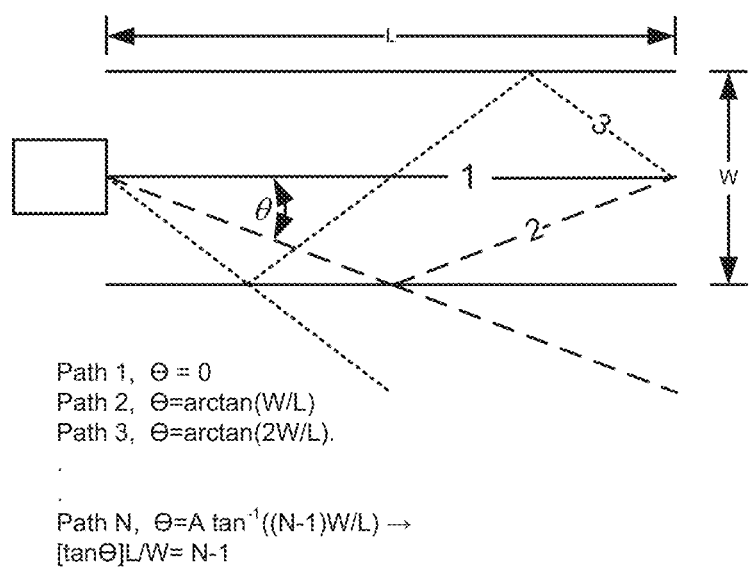
FIG. 5 diagrammatically depicts the number of bounces that can occur in a parallel mirror version of the invention based on the reflection paths of target reflected by the mirrors.

For example (See FIG. 4), the field of the straight through path is given by: Full field of straight-through path (degrees) =2*arctan(0.5*W/L), where L is the distance from the entrance pupil of the camera/lens to the target. So looking at the example at hand where:
W=8.39 inches; and
L=10 inches,
the full field of view of the straight through path=2*arctan (0.5*8.39/10)=45.5 degrees Number of bounces=(L/W)*tan (field_angle)−1, where the field angle is measured relative to the optical axis of the system as shown in FIG. 5.

For wide field systems, the number of bounces within the light box can become quite large. For instance, if you tried to test a fisheye lens with a full field of view of 160 degrees with a kaleidoscopic light box with parallel walls that is 10 inches long with an 8 inch distance between the opposing mirrors, the number of bounces at a ½ angle of 80 degrees would be approximately:
Number of bounces=(10 inches/8 inches)/tan(80) =1.25*5.67=7.08 rounds to 7 bounces.

Thus, across the full field of view, there would be 13 (2*7 double counts the straight-through path with one path subtracted).

If it is desired to test the camera/lens at a longer object conjugate, then it would be necessary to make the mirror box longer, and this would linearly increase the number of bounces.

One way to mitigate this is be to alter the apparent location of the target by placing a focusing lens 30 at the end of the kaleidoscopic mirror box 20 (See FIG. 6) nearest the target to create a virtual image of the target at the appropriate distance relative to the end of the mirror box. For instance, if a lens where placed near the end of the mirror box and a target or multiple targets were placed at the focus of the lens so that the target was imaged at infinity, then all of the targets viewed at the kaleidoscope light 20 box would be imaged at infinity as depicted in FIG. 6.

There is a complication in this case in that the off-axis rays do not pass through the center of the target so the on-axis (straight through) target would not be centered in the off-axis reflections. In this case, multiple targets would be placed in the target plane, each one located at an appropriate distance off-axis (distance=focal_length_of_lens*tan(off-axis angle)). Thus, the target placed at the focus of the lens would actually be comprised of multiple targets, one for each off-axis viewing angle.

This means that the lens used with the target to present the off-axis target must have a field of view that matches the test field of view of the camera/lens under test and should have a large pupil to allow for viewing a target of substantial size. This is easy to accomplish for a small or moderate field of view system (50-70 field of view system) where one can use high quality commercial off the shelf lenses such as those developed for 35 mm photographic applications, SLR or medium format imaging requirements.

Note also, that the target can be adjusted in focus relative to the lens to present a target at alternative conjugates. Usually, one would want to test the camera/lens at a conjugate short of infinity, which would require moving the target closer to the collimating lens 30. The relationship between the position of the lens, the target and the image of the target is well known to those skilled in the art of optical engineering. This relationship is called the lens equation is given as (Refer to FIG. 7): 1/focal_length=1/object_distance+1/image distance.

Note that, if the object distance is equal to the focal length of the lens, the image distance is infinite. As the target is moved towards the lens, the focus of the target also moves in from infinity towards the lens and appears to be closer to the lens. If the lens is an ideal lens and infinitely thin, then the target would move closer until it appeared to be in the plane of the lens as shown in FIG. 7.

To further reduce the number of bounces required to achieve a desired target image field position while also having a shorter box, one can taper the kaleidoscopic mirror box. Instead of building a reflective box of identical rectangular mirrors at right angles to each other, a mirror box is built with a square or other suitable cross-section, but with a larger opening at the target end of the box as shown with the geometry in FIG. 8 where the tapered box is designated at 42 and has opposed tapered mirrors 42 and 44. Note that the cross sections do not need to be square, but can be rectangular, triangular, or hexagons or some other sensible tiling pattern. Also note that in this case the direction of imaging is reversed from the previous examples.

Turning now to FIG. 8 again, which is a 2D representation of support structure or mirror box 42 with a taper, it can be appreciated that if the included angle in the taper is 20 degrees (the top mirror 42 is tilted up by 10 degrees with respect to the optical axis, OA, and the bottom mirror is tilted down by 10 degrees), then at every reflection off the mirror, the angle is reduced by 20 degrees (law of reflection). So, as shown in this figure, a ray that initially leaves the target at 5 degrees, enters the lens at 25 degrees (one bounce), and another ray that leaves the target at 9 degrees enters the lens at 49 degrees. This can be continued to three or 4 bounces in which the rays enter the lens at 80+ degrees allowing for testing of very wide field cameras/lenses, including fisheye lenses and those used in cell phones.

Figure 9:
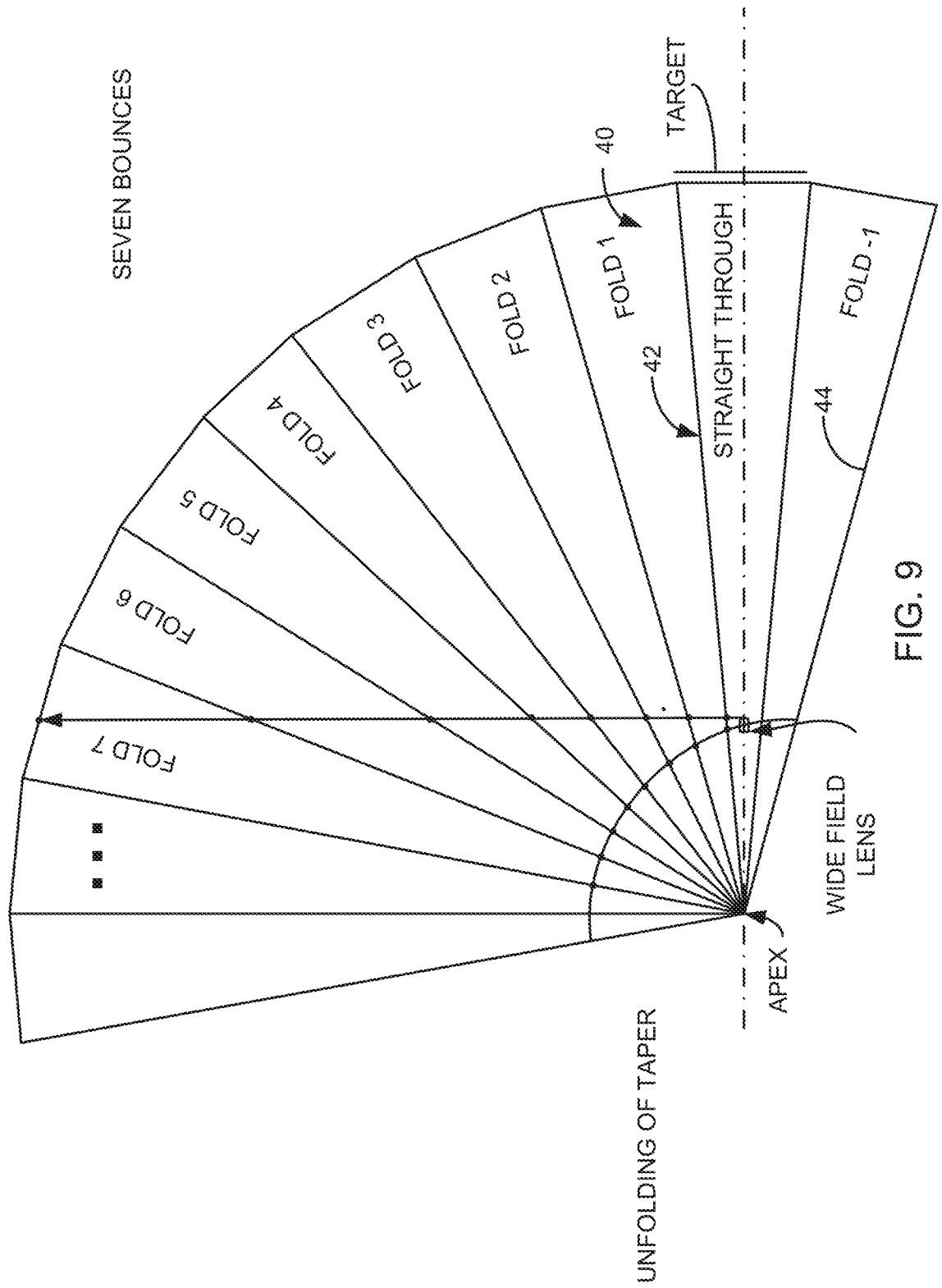
FIG. 9 diagrammatically depicts an unfolded example of reflection points for paths in a tapered mirror box in accordance with the invention.

One tool that is useful for visualizing the ray paths is to unfold the optical path associated with the tapered mirror assemblies as illustrated in FIG. 9 where the position of the target and camera lens have been reversed for convenience. FIG. 9 depicts such an unfolding done on a computer in which the taper is patterned using built-in tools in the solid modeling program, SolidWorks. Alternatively, this can also be done by making a "paper doll model" of the taper as shown in FIG. 9A.

Figure 8:
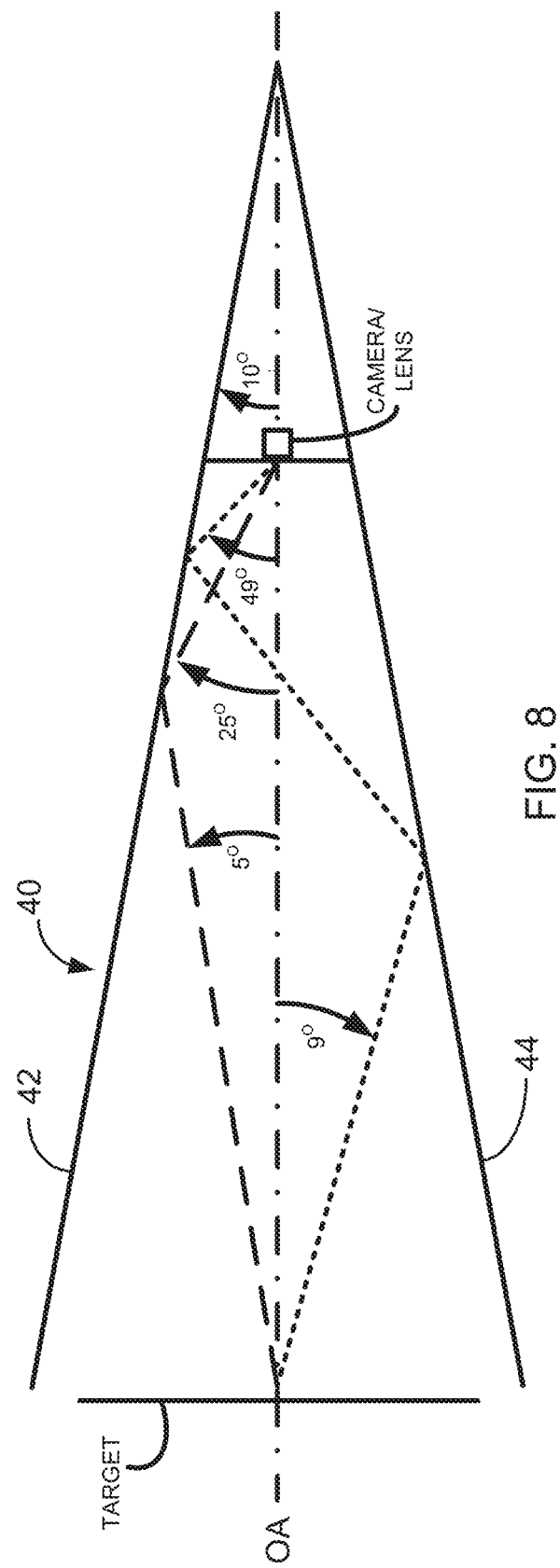
FIG. 8 diagrammatically illustrates a tapered mirror box in accordance with the invention.

In the case of the taper, the open end of the taper unfolds in a pattern that is centered on the apex (point) of the taper as in FIG. 9. Thus, the targets do not all lie in a flat plane, but rather on a series of flats surfaces adjacent but spatially separate from one another. Thus, the object field appears to wrap around the camera/lens under test. Again, a lens can be placed at the target end of the box as shown in FIG. 8. Its field of view does not need to match the field of view of the camera/lens under test. In fact, the field of view of the lens is further reduced by the manner in which the unfolded pattern warps about the lens under test.

In practicing the invention, it is preferably to use highly reflective mirror surfaces that can be provided through the use of suitable coatings, but it will be recognized that reflective losses will be modest in any case because off-axis images are being generated at relatively high angles of incidence where reflection losses are small. Highly reflective coatings (reflectivity >92%) can be readily achieved using aluminum coatings. Even higher reflectivity coatings can be obtained at additional cost.

One can readily envision a system in which both the kaleidoscopic boxes and targets are interchangeable to allow for testing a broad variety of cameras or lenses. Also, targets can be inserted at different object distances to allow for testing at different conjugates, or an auxiliary lens can be used to present a virtual object to the mirror box. Furthermore, since the geometry of the boxes can be well characterized, the distortion of the lenses can be assessed by measuring the apparent scale and location of the targets in the image plane.

Again, FIG. 1 depicts a finite target used with a tapered mirror box (white tube contains a 4 mirror, 20 degree taper assembly) and a widefield fisheye camera. An example of tapered mirror box used in the system of FIG. 1 is shown in perspectives in FIGS. 10 and 11 where it is shown generally as mirror support structure or mirror box 50.

Figure 10:
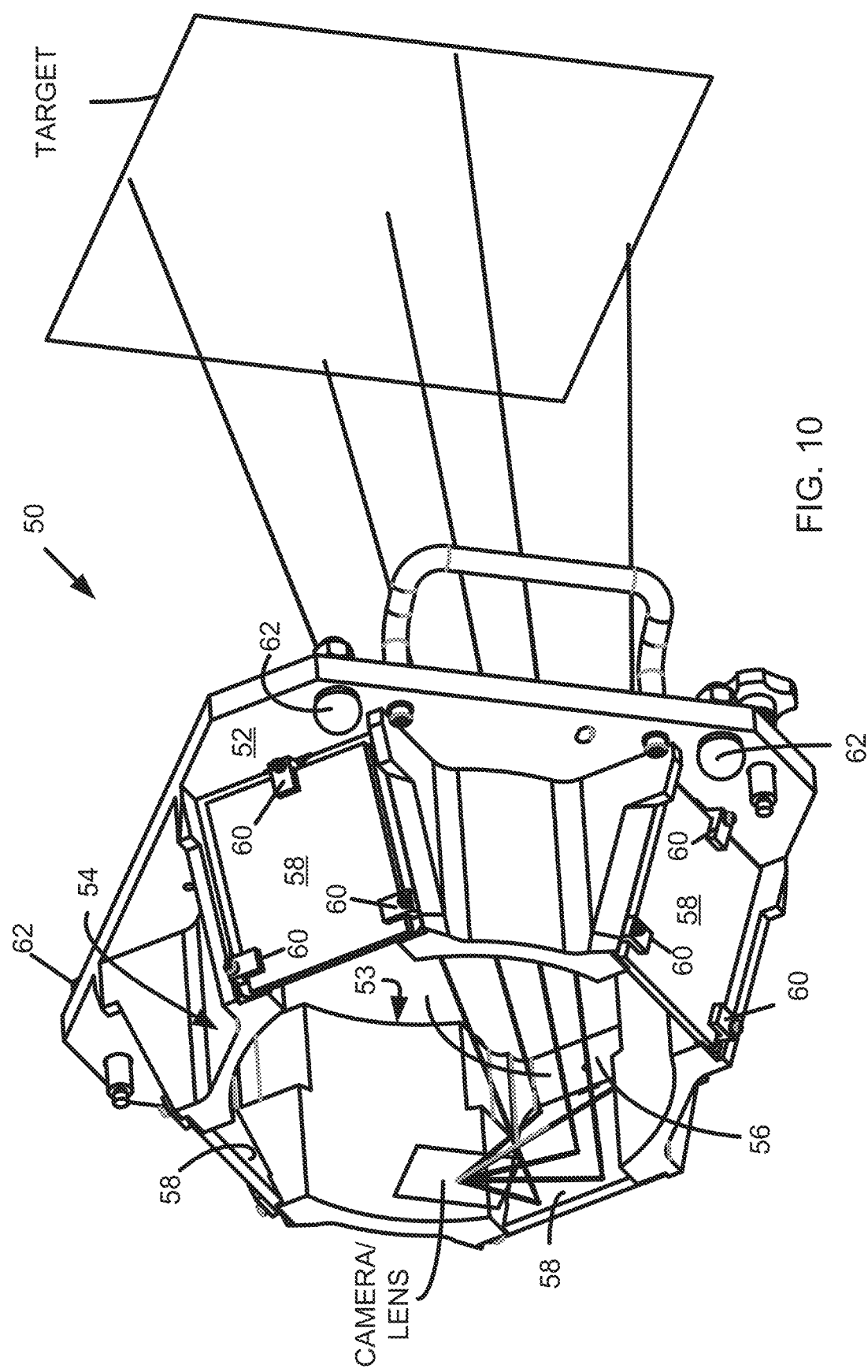
FIGS. 10 and 11 diagrammatically show front and back perspectives of a tapered mirror box used in the system of FIG. 1.
Figure 11:
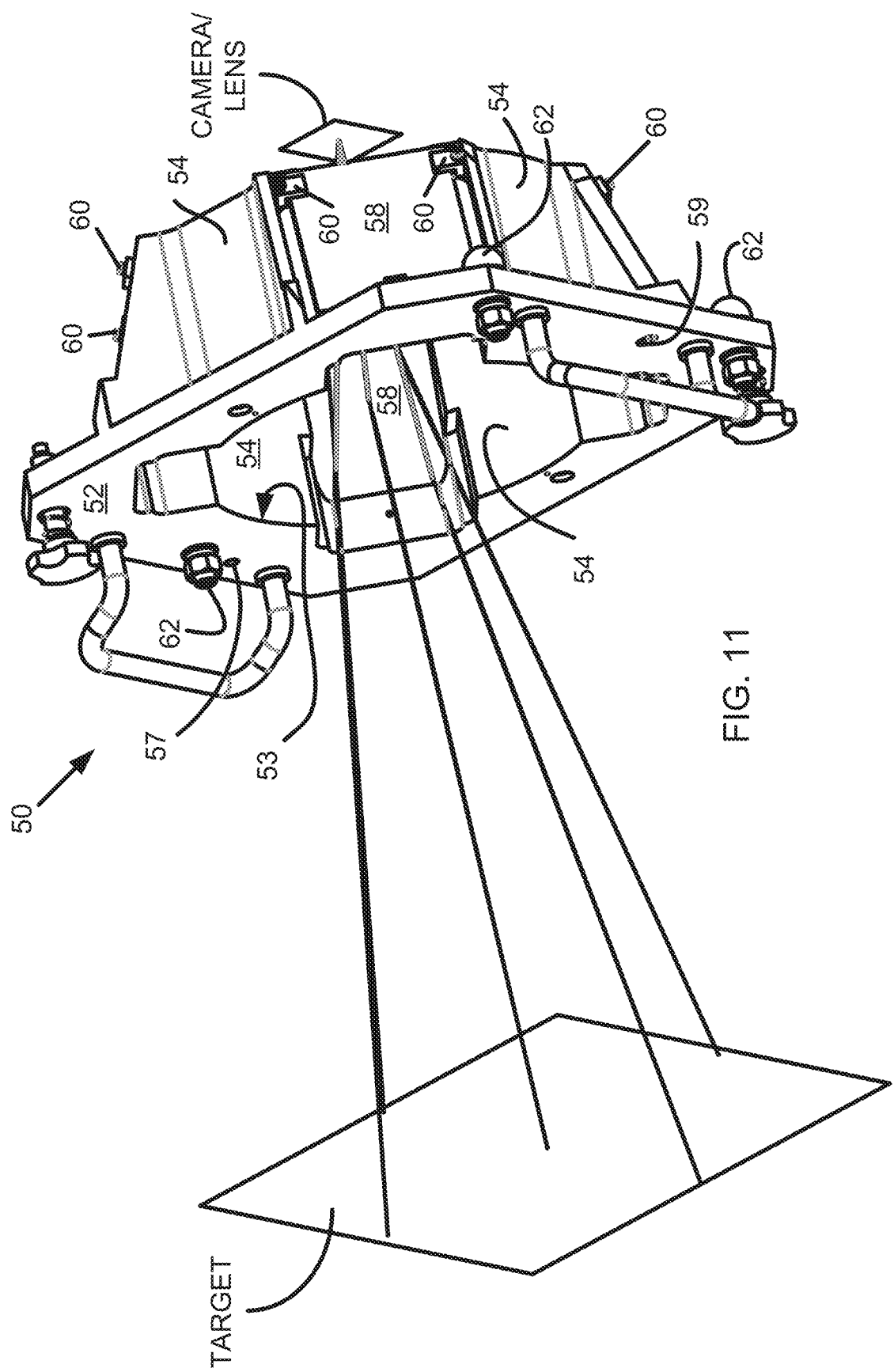

Reference is now made to FIG. 10 which shows the mirror box 50 generally from the perspective of the camera/lens to the target, and FIG. 11 which shows the mirror box 50 generally from the perspective of the target to the camera lens.

Mirror box 50 is preferably machined from a single piece of metal, preferably aluminum for lightness and relatively low thermal coefficient of expansion. In practice, all of the features of mirror box 50 are preferably initially machined to a predetermined precision, and then this initially machined version is heat treated to reduce residual stresses. Afterwards, the initially machined version is re-fixtured using provided reference surfaces 57 and 59 (See FIG. 11), inspected again for conformance with specifications, and re-machined as necessary to required tolerances, typically no more than a few thousandths. In this way, the precision required for mounting and positioning its mirrors with respect to the optical axis are assured, especially with respect to spacing, tilt, and tip.

Major sections of mirror box 50 comprise a base 52, having an opening 53, that is provided with precision locating features (57 and 59, FIG. 11) and a hollow mirror mount section

54 that depends from the base, extending rearwardly along the optical axis and is generally in the form of a truncated hollow polyhedron, which in this example, has four more or less symmetrically disposed, equally spaced apart, flat mirror mounting surfaces 56 or facets that are tilted with respect to the optical axis, OA, and are connected by suitably spaced apart intervening annular conical rib sections 54, each connecting an edge of adjacent mirrors 58. Each flat mirror mounting surface 56 is provided with an aperture in which the reflective surface of a mirror resides. In effect, the mirror mounting surfaces form a mount whose peripheral edges define the aperture and are provided three points defining planes on which the mirrors lie.

Base 52 has three adjustable hemispherical balls 62 to provide the support structure with a deterministic reference to align the optical axis. The three balls 62 are placed against a reference flat and are adjusted until the base is parallel to the reference flat thus making it perpendicular to the optical axis, OA, and the mirror mount section 54 parallel to the optical axis within design tolerances. As is known, the three adjustable hemisphical balls act as a kinematic reference that operates to define a plane thereby allowing the entire mirror box to be referenced so that the optical axis of mirror box can be aligned with that of the system with which it is used. This feature also permits the assembly to be easily mated with corresponding reference features in systems with which it will be used. Hence, this adds to its portability. It will be recognized that such a kinematic reference feature may also be placed around the circumferential features of the support structure 50 or some other convenient location.

Likewise, each mirror 58 resides within its corresponding mounting frame or facet on three mounting bosses machined to define planes properly angled with respect to the optical axis of mirror box 50. Mirrors 58 are held in place against their respective three point mounting bosses via clips 60. Since the requisite precision is machined into the features of the support structure from a single piece of material, it is not necessary to individually adjust each mirror, thus making the support structure further portable from one measurement set up to another while at the same time assuring that none of the mirrors can go out of adjustment, which would otherwise be possible with an adjustable mount system for each mirror.

As mentioned earlier, the target images formed by a tapered mirror box do not reside exactly in a plane but rather on a segmented approximately curved spherical surface thus causing the off-axis images to have a sag and tilt with respect to a completely planar surface thus introducing a slight blur in the images when imaged by the test optic. However, this blur is determinable for an individual sets of test geometry and can either be of acceptably small levels or can be determined and compensated for in subsequent analytical calculations.

Figure 11A:
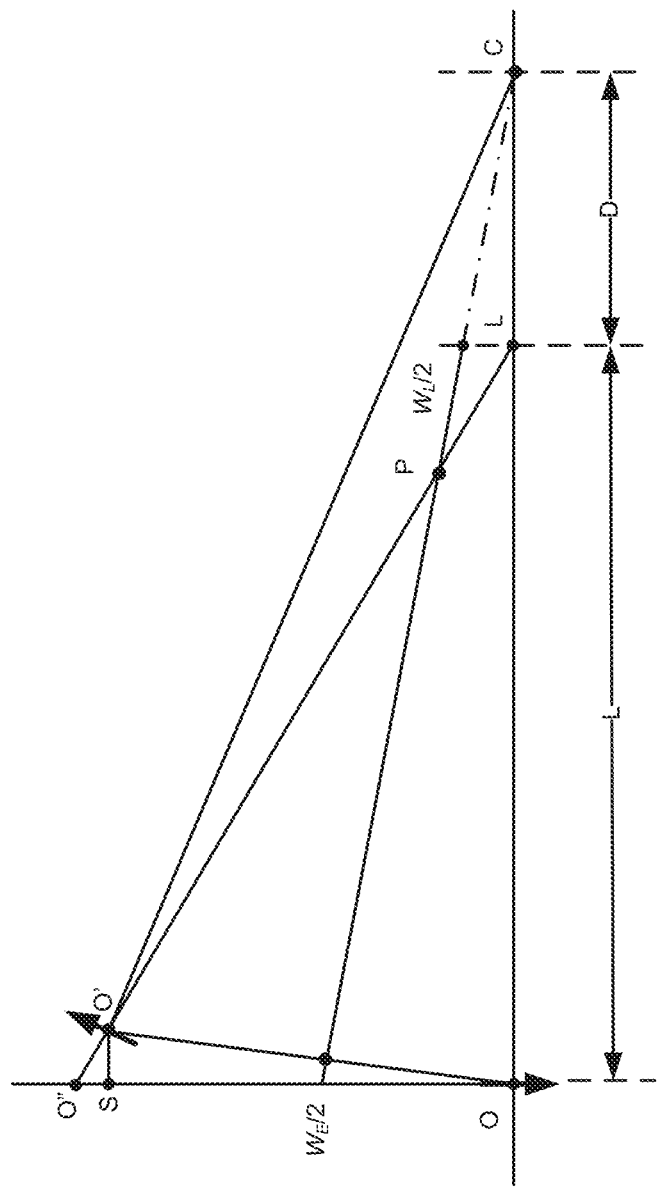
FIG. 11A shows a diagram of an tapered mirror box geometry along with relevant parameters used to calculate sag and image blur with field angle.

To best understand this, reference is now made to FIG. 11A, which shows the geometry of a tapered mirror box along with relevant parameters used to approximately calculate sag and image blur with field angle.

Starting with definitions, we have:
$W_E$ is the width of opening near object.
$W_L$ is the width of the opening near lens under test.
L is the point where the imager entrance pupil is located.
C is the vertex of the cone for the mirror box.
O is the on axis object location.
O" is the off axis object location without the mirror box.
O' is the off axis object location with the mirror box.
$\overline{OC} = \overline{O'C} = R$
$\overline{O''L} - \overline{O'L}$ is the shift in the off axis object when using the mirror box Now deriving relationships from parameters, we have:

$$R = L + D$$

Assuming that in the paraxial regime, $$\overline{O''L} - \overline{O'L} \approx S, \text{ and } W_E \approx \overline{OS}$$

Using the parabolic approximation of the sag of a spherical surface (valid for $S \ll r$, $$S = \frac{r^2}{2R}$$

If $R = L + D$ and $r = W_E$, $$S = \frac{W_E^2}{2(L+D)}$$

Using similar triangles we see that, $$\frac{W_E/2}{L+D} = \frac{W_L/2}{D}$$

Solving for D, $$D = \frac{W_L L}{W_E - W_L}$$

And inserting into the equation for R yields, $$R = \frac{W_L L}{W_E - W_L} + L = L\left(1 + \frac{W_L}{W_E - W_L}\right)$$

The sag equation then becomes:

$$S = \frac{W_E^2}{2L\left(1 + \frac{W_L}{W_E - W_L}\right)} = \frac{W_E(W_E - W_L)}{2L}$$

The image defocus (d) that occurs from using the mirror box will be equivalent to $$d = m^2 S = m^2 \frac{W_E(W_E - W_L)}{2L}$$

since the longitudinal magnification is paraxially equal to the transverse magnification squared and where the transverse magnification can be approximated by $$m \approx \frac{f}{L}$$

and f is the effective focal length of the lens. Now the defocus can be written $$d = \left(\frac{f}{L}\right)^2 \frac{W_E(W_E - W_L)}{2L}$$

For a given object distance, L L, and mirror box opening $W_E$, the image defocus will be bounded by a maximum when $W_L=0$. Therefore $$d \triangleleft \left(\frac{f}{L}\right)^2 \frac{W_E^2}{2L} = \frac{f^2 W_E^2}{2L^3}$$

Using this equation we can calculate the maximum image blur due to the usage of the mirror box. Given, F/#, where a is the lens aperture size, the geometric image blur, b is defined as $$b = \frac{d}{F\#}$$

Given the upper limit in the image defocus the blur will always be less than, $$b \triangleleft \frac{d}{F/\#} = \frac{1}{F/\#} \frac{f^2 W_E^2}{2L^3} = a \frac{f W_E^2}{2L^3}$$

Now for an example calculation:
Lens under test:

$$f = 2 \text{ mm}, F/\# = 1.5, W_E = 50 \text{ mm}, L = 150 \text{ mm}$$

$$d \triangleleft \frac{(2 \text{ mm})^2 (50 \text{ mm})^2}{2(150 \text{ mm})^3} = \frac{10{,}000}{45{,}000} \text{mm} = 1.48 \ \mu\text{m}$$

$$b \triangleleft 1.33 \text{ mm} \frac{2 \text{ mm}(50 \text{ mm})^2}{2(150 \text{ mm})^3} = 0.98 \ \mu\text{m}$$

It can be appreciated from this analysis that for a mirror box with parallel mirrors, $W_E$ is equal to $W_L$ so the sag S is zero or stated another way, the target images for this case all lie in a flat plane.

Figure 12:
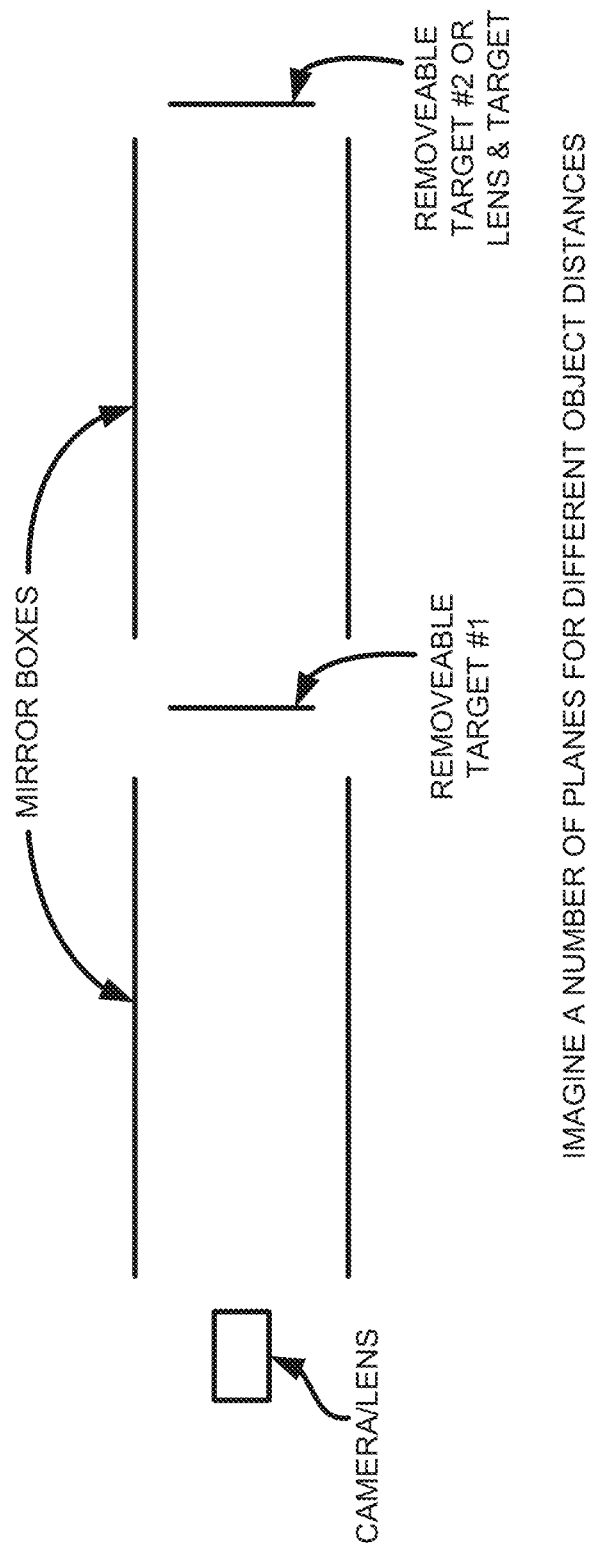
FIG. 12 diagrammatically depicts the usage of serial mirror boxes to allow for insertion or removal of target to provide testing at different object conjugates.

FIG. 12 depicts the usage of serial mirror boxes to allow for insertion or removal of targets to provide testing at different object conjugates.

Figure 13:
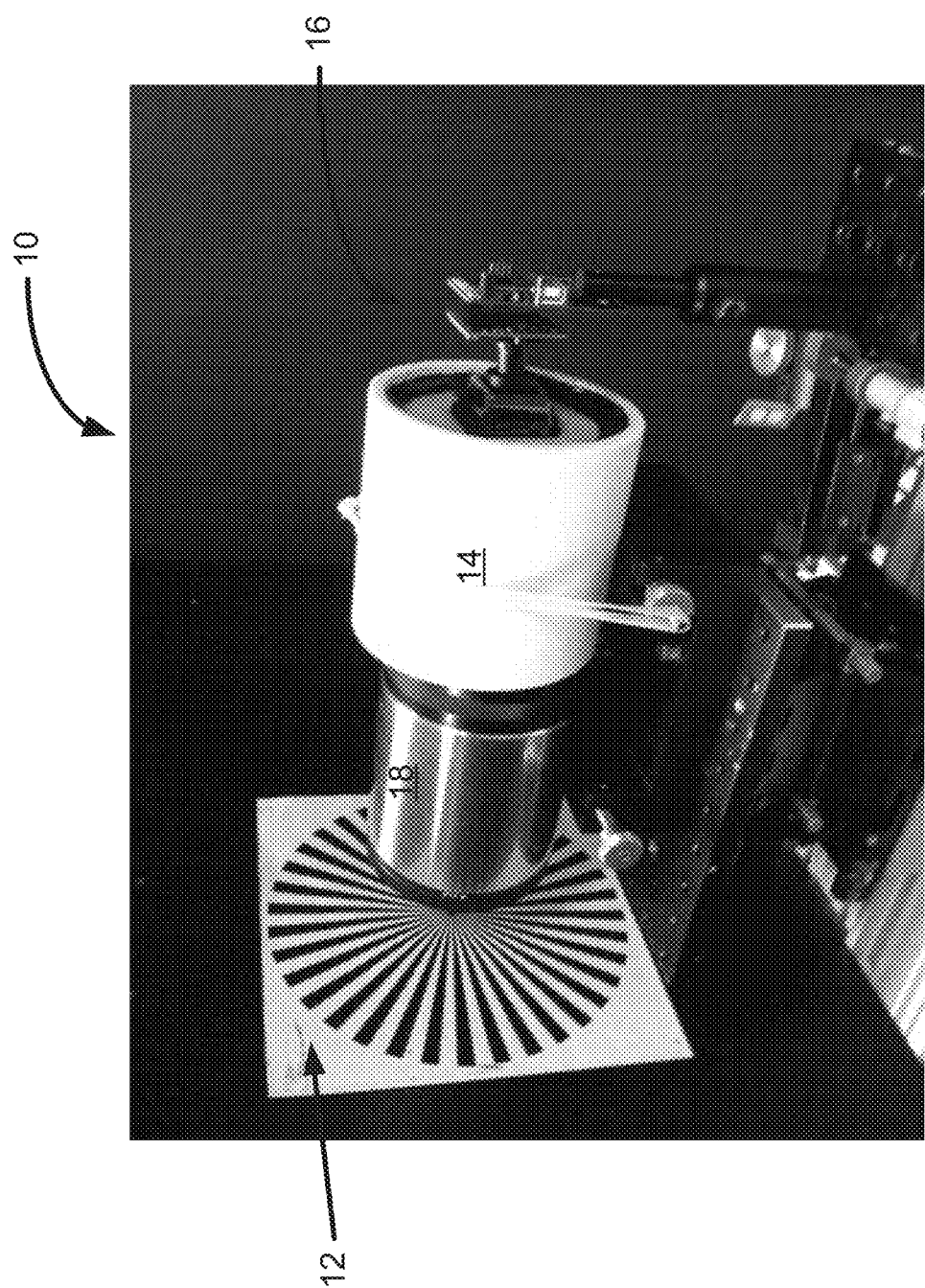
FIG. 13 is a photograph of the system of FIG. 1 further showing it in use with an auxilliary lens to provide a virtual target at arbitrary distance.

FIG. 13 depicts the same mirror box system of FIG. 1 except that it is used with an auxilliary lens 18 to provide a virtual target at arbitrary distance as discussed more fully in connection with FIGS. 6 and 7.

Figure 14:
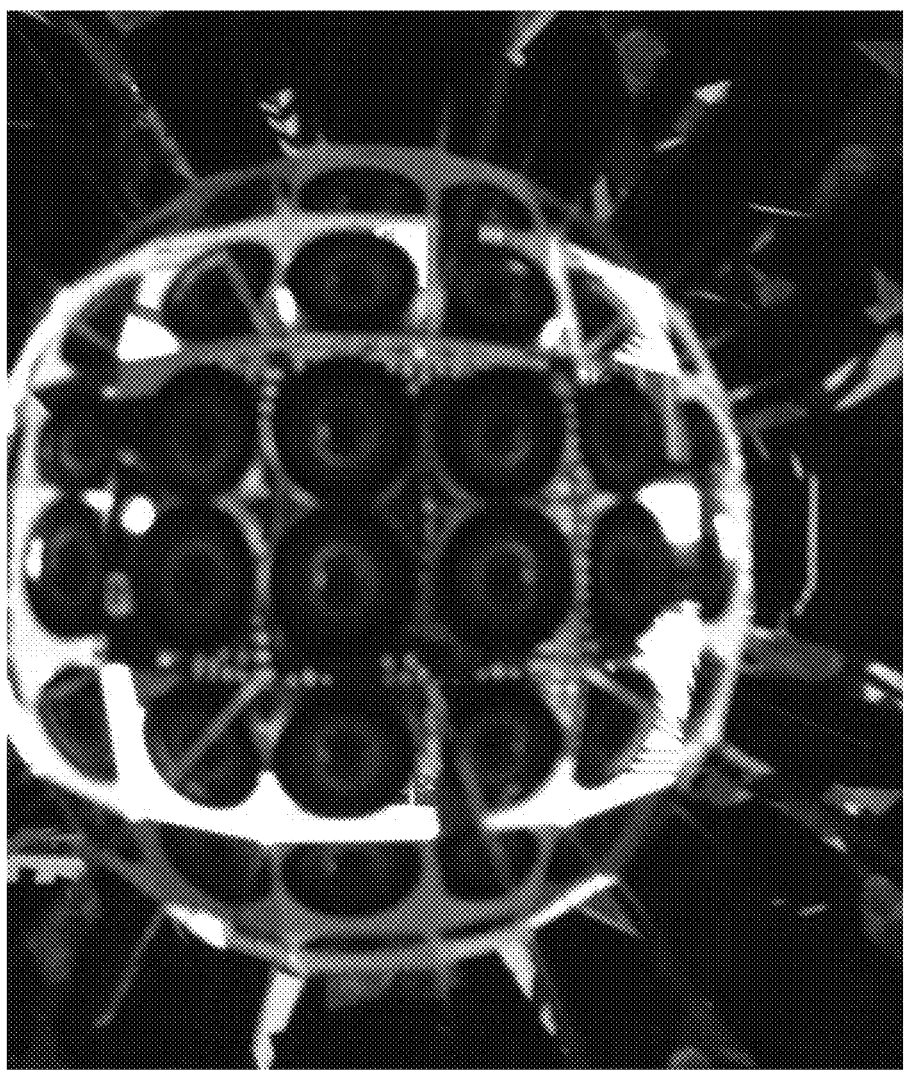
FIG. 14 is a photograph taken with an iPhone camera looking into the wide end of the tapered box of FIGS. 10 and 11 used in the system of FIG. 1.

FIG. 14 is a photograph taken with an iPhone camera looking into the wide end of the tapered box of FIG. 1. This shows multiple images of the fisheye lens and provides a visual example of the bounces and off-axis angles.

The test set up can be constructed to work in either a vertical or horizontal configuration. In a vertical configuration, the optical axis of the camera/lens is pointed upwards (or alternatively downwards) and the axis of the mirror box is vertical. This minimizes the size of the required floor footprint. In this case the targets lays in a plane parallel to the floor. If the apparatus is set up in a horizontal configuration, the optical axis the camera/lens and mirror box is parallel to the floor and the target is located in a vertical plane perpendicular to that axis.

Auxiliary lenses can be placed between the mirror box and the target to form a virtual image in front of the mirror box that is then multiply reflected by the mirror box presenting a more distant virtual image across the full field of view.

Alternatively, an auxiliary lens can be placed between the test optic and the exit aperture of the mirror box to reimage the full wide field of kaleidoscopic targets to a different conjugate. In both configurations, the auxiliary lenses can be changed to present targets at different conjugates or a single auxiliary lens with adjustable focus could be used to continuously change conjugates.

Other variants of the invention will be obvious to those skilled in the relevant arts based on the teachings of the disclosure, and it is intended that such variants be within the scope of the claims.

What is claimed is:

1. Apparatus for providing a plurality of images of at least one optical evaluation target over a predetermined field of use of a test optic, said apparatus having an optical axis and comprising:
   a generally hollow mirror support structure, said hollow mirror support structure having entrance and exit apertures in line along the optical axis, said generally hollow mirror support structure having a plurality of individual mirror mounts positioned around the optical axis with each mount arranged to locate each mirror at a predetermined angle with respect to the optical axis, each individual mirror mount having at least three points sufficient to establish the planar location and angular orientation of its corresponding mirror, said hollow mirror mount support structure also having a deterministic reference plane with which the optical axis is precisely aligned; and
   a plurality of mirrors one each of which is placed in a corresponding one of said mirror mounts, the length of said apparatus along the optical axis, the position and orientation of said mirrors with respect to the optical axis and said entrance and exit apertures being such that said apparatus generates multiple images of an optical evaluation target apparent through said entrance aperture by providing multiple folded optical paths between the optical evaluation target arid the desired field locations of the test optic.

2. The apparatus of claim I wherein said generally hollow mirror support structure includes a mounting base in which said entrance aperture is formed and from which said mirror mounting planar frames depend.

3. The apparatus of claim 2 wherein said mirror mount support structure is machined of a single piece of material to provide built-in dimensional precision and thermal stability.

4. The apparatus of claim 3 wherein said single piece of material is aluminum.

5. The apparatus of claim 2 wherein said mounting base is generally perpendicular to the optical axis.

6. The apparatus of claim 1 wherein said mounting base further comprises a three point adjustable ball mount by which said mounting base can be adjusted to be parallel with respect to a reference flat.

7. The apparatus of claim 1 wherein said mirrors are parallel to the optical axis so that the off axis images formed thereby all lie in flat field.

8. The apparatus of claim 1 wherein said generally hollow mirror mount support structure is generally in the form of a truncated polyhedron that is tapered along the optical axis from said entrance aperture to said exit aperture and wherein said individual mirror mounting planar frames lie in planes at predetermined angles with respect to the optical axis so that the plurality of off axis field images generated by said apparatus lie in a slightly curved spherical surface that sags from a plane by a known amount.

9. The apparatus of claim 8 wherein said sag is approximately given by:

$$S = \frac{W_E^2}{2L\left(1 + \frac{W_L}{W_E - W_L}\right)} = \frac{W_E(W_E - W_L)}{2L}$$

where:
$W_E$ is the width of said entrance aperture near an optical evaluation target'
$W_L$ is the width of exit aperture near a lens under test'
L point where the entrance pupil of the apparatus is located with respect to said exit aperture.

10. The apparatus of claim 1 further including and auxiliary focusing lens located between said apparatus and the optical evaluation target to alter the apparent location of the optical evaluation to create a virtual image of the optical evaluation target at an appropriate distance relative to the end of said apparatus.

11. The apparatus of claim 1 further including an auxiliary focusing lens located between said apparatus and the test lens to alter the apparent location of the optical evaluation to create a virtual image of the optical evaluation target at an appropriate distance relative to the end of said apparatus.

12. The apparatus of claim 1 further including a plurality of said apparatus arranged in serial fashion to allow for insertion or removal of optical evaluation targets to provide testing at different object conjugates.

13. The apparatus of claim 1 further including at least one optical evaluation target positioned near said entrance aperture and selected from the group comprising fishtails, lines, crosses, star targets, sinusoidals, pinholes, checkerboards, dots, and USAF resolution patterns.

14. The apparatus of claim 1 wherein the number of paths along which images propagate is given by:

$$[\tan\Theta]L/W = N - 1,$$

where L is the length of said apparatus. W is the width of said entrance aperture, N is the number of paths, and $\Theta$ is the semi-field angle for the path of the second mirror bounce of said apparatus.

15. The apparatus of claim 1 further including a fixture for mounting a test optic with respect to said exit aperture.

16. The apparatus of claim 1 further including a fixture for mounting a test optic and an auxiliary lens with respect to said exit aperture.

17. The apparatus of claim 1 further including a fixture for mounting a test optic with respect to said exit aperture and an auxiliary lens with respect to the entrance aperture.

* * * * *